United States Patent

[11] 3,633,173

| [72] | Inventor | Charles F. Edge<br>Los Angeles, Calif. |
|---|---|---|
| [21] | Appl. No. | 19,600 |
| [22] | Filed | Mar. 16, 1970 |
| [45] | Patented | Jan. 4, 1972 |
| [73] | Assignee | Hughes Aircraft Company<br>Culver City, Calif. |

[54] DIGITAL SCAN CONVERTER
4 Claims, 7 Drawing Figs.

[52] U.S. Cl. .................................................. 340/172.5, 343/5 DP
[51] Int. Cl. ........................................................ G06f 9/20
[50] Field of Search ........................................... 340/172.5; 343/5 DP, 5 SC

[56] References Cited
UNITED STATES PATENTS

| 3,335,409 | 8/1967 | Heller et al. ................... | 340/172.5 |
|---|---|---|---|
| 3,408,647 | 10/1968 | Dynan .......................... | 343/5 X |
| 3,277,449 | 10/1966 | Shooman ....................... | 340/172.5 |
| 3,535,694 | 10/1970 | Anacker et al. ................ | 340/172.5 |
| 3,440,618 | 4/1969 | Chinlund ....................... | 340/172.5 |

*Primary Examiner*—Gareth D. Shaw
*Assistant Examiner*—Sydney R. Chirlin
*Attorneys*—James K. Haskell and Walter J. Adam ABSTRACT: A digital scan converter is disclosed in an exemplary radar environment where range bin data samples are received in range bin series from successive range sweeps for a moving target indication. A single memory having a read-write cycle capable of reading old data and immediately writing new data for each location addressed, is employed with an address generator that alternates between two modes of operation. The first mode generates a continuous numerical sequence of addresses which scans the memory locations mathematically grouped in columns, one column for each range sweep. The second mode generates a pattern of addresses which scans the memory locations which are mathematically grouped in address columns defined by the first sequence.

Fig. 1.

Charles F. Edge,
INVENTOR.
BY.
Walter J. Adam
ATTORNEY

DIGITAL SCAN CONVERTER

BACKGROUND OF THE INVENTION

This invention relates to reordering a sequence of data received from successive lines or columns of a rectangular source array to a sequence corresponding to data from orthogonal lines or rows of the source array.

It is often desirable, or necessary, to convert a sequence of data, such as that produced in scanning a given field with a sensor along virtually parallel lines in one direction, into a different sequence corresponding to that produced by scanning the same field along virtually parallel lines in a direction perpendicular to the direction of actual scanning. For example, for synthesized doppler filter banks in a digital data processor, range-gated data samples received sequentially from a radar operating in a B-scan mode must be reordered from range sweeps along successive azimuths to azimuth sweeps along successive range lines. Stated more generally, the problem is to receive data from a rectangular array in a sequence of sample points from successive parallel lines or columns, and to reorder the data for processing into a sequence of sample points from successive orthogonal lines or rows. This problem occurs most frequently in radar applications, such as in the example just cited, or in the more general case of obtaining range-gated, cross-correlations data.

Probably the best-known previous method for performing this type of scan conversion, which may be referred to as an orthogonal write-read conversion, involves the use of two analog storage tubes. While one tube receives new data in range-bin sequence for each radar sweep of a given field, the second storage tube simultaneously reads out previously recorded data in a direction perpendicular to the direction in which the data was stored, i.e., in a sequence with one data sample from successive range sweeps at a given range followed by similar sequences at successively greater ranges. After all range bins have been scanned from the second storage tube, its mode of operation is changed to read in data from the next scanning cycle. At the same time that the second tube begins storing data, the first storage tube is used to read out the data just recorded in a direction perpendicular to the direction in which stored. After the second storage tube is filled with input data, the roles of the storage tubes are again reversed. The second storage tube is required to allow all, o9 essentially all, radar pulses to be accepted and processed because a storage tube does not normally allow simultaneous write and read on the same tube.

Analog storage tubes inherently have such great flexibility that their use in orthogonal write-read conversion is a natural and obvious application. However, their use for reordering data samples as used in a digital data processor is not entirely satisfactory because of the difficulty in maintaining perfect data registration since the data is being stored in analog form. Moreover, the analog storage tube has limited dynamic range. What is required is digital means for performing the orthogonal write-read conversion.

A digital method analogous to the analog method employing two electronic scan converter tubes is implemented with two separate random access memories corresponding to two analog storage tubes such that while an array of data is being stored in one memory, an array of data stored in the other memory during the preceding scanning cycle is read in a sequence effectively perpendicular to the direction in which stored. Such a digital method avoids the problem or registration in the use of two electronic storage tubes. It may be readily used to collect range-gated doppler data and simultaneously perform a scan conversion to provide an output sequence containing all samples read on a range-bin basis (i.e., an output sequence of samples from the same corresponding range bin over successive range sweeps) over a desired integration period.

In the digital memory method for scan conversion, a complete field of data to be reordered is referred to as an array of data. Each array contain NM data samples, where N is the total number of range bins in a single sweep at a given azimuth, and M is the total number of range sweeps at successive azimuths. Thus, for a range gated radar application, the array consists of M radar pulse range sweeps or traces, each range sweep having N discrete data samples or range bins. In a typical application, the time over which an array of data is collected would determine the integration period, such as in range-gated doppler radar application, but that is not always the case. Moreover, this digital memory method of reordering an array of data has a more general application than to just doppler radar applications.

Regardless of the application of the prior-art, two-memory digital method for reordering an array of data, an obvious disadvantage is a requirement for two complete memory systems. It has the advantage that the address sequence is always the same for both memory systems, but that advantage is offset by the need for two independent sequence generators, each alternately generating two different sequences, or two separate address sequence generators each operating in a fixed mode and both time shared by the two memories such that one generator operating in one sequence mode is used alternately by the two memories to store data while the other sequence generator (operating in another mode) is being used by the other memory to read data. In either case, two complete memory systems, or the equivalence of two complete memory systems, are required. For many applications, such as in airborne systems, it would be desirable to provide a digital scan converter of the orthogonal write-read type using only one memory system. That would have the advantage of conserving not only space and weight but also power, all of which are vital considerations in the design of any airborne system.

SUMMARY OF THE INVENTION

Briefly, the system of the present invention utilizes a single memory having a number of addressable memory locations sufficient for storing one rectangular array of data and an address sequence generator having two modes of operation. In one mode, for a first and all subsequent odd-numbered array-scanning cycles, the memory locations are addressed in a predetermined order corresponding to the order in which the array of data is received. In the second mode of operation, which is used for the second and all subsequent even-numbered array-scanning cycles, the memory locations are addressed in a predetermined order for reading out the previously stored data in an order which corresponds to scanning the original array in a direction perpendicular to that in which scanned for writing data into the memory locations, i.e., for ordering the array of data previously stored such that corresponding elements from all written lines of data are read out orthogonally in sequence within a given readout line. The memory is provided with a read-write cycle for reading out an element of data from an addressed location at the time immediately preceding the instant a new element is to be written into that location.

The novel features that are considered characteristic of this invention are set forth with particularity in the appended claims. The invention will best be understood from the following description when read in connection with the accompanying drawings.

DESCRIPTION OF THE PREFERRED EMBODIMENTS

Figure 1:
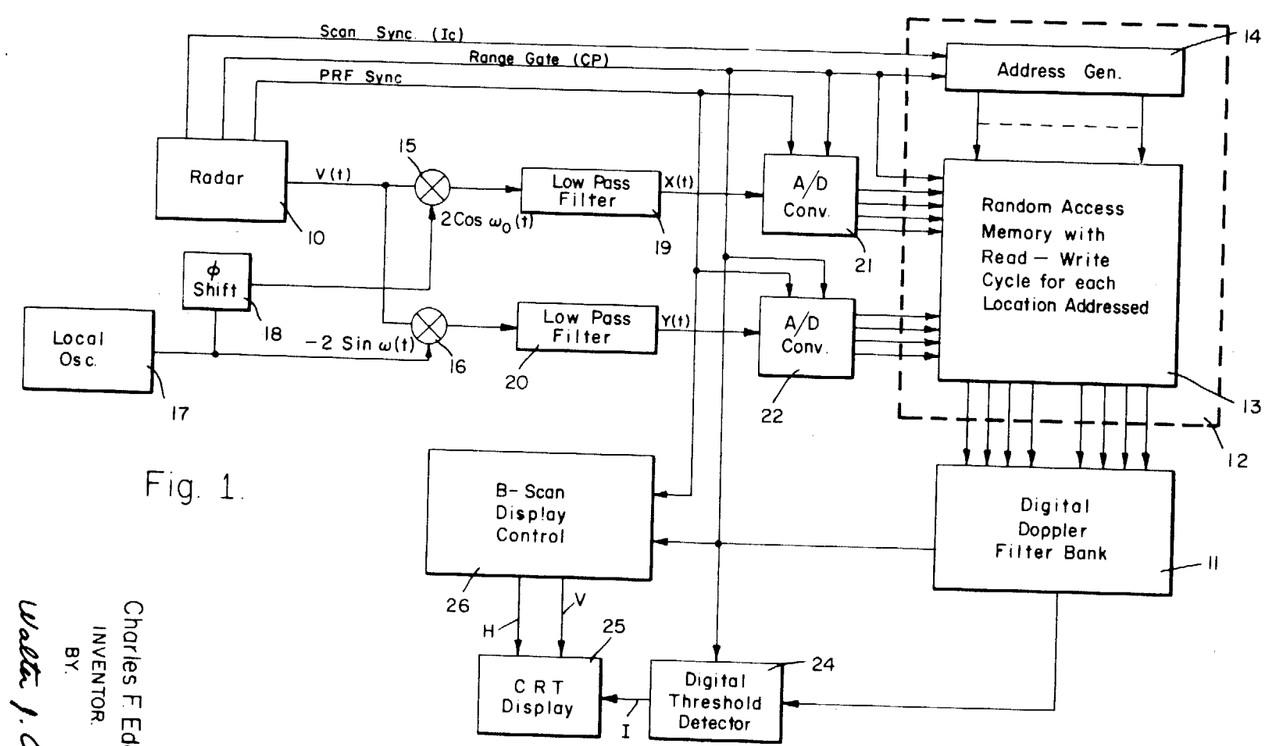
FIG. 1 is a schematic block diagram of an exemplary application of the present invention.

An exemplary application of the present invention is illustrated in FIG. 1 as including a radar 10 for transmitting radar pulses at successive azimuth angles for scanning a field in the B-scan mode. Each radar pulse produces a range sweep resulting in offset video $V(t)$ being received. The radar pulses are produced at a predetermined pulse repetition frequency (PRF), and each radar pulse produces a PRF-sync signal which synchronizes the generation of range-gate pulses referred to hereinafter as clock pulses (CP).

This exemplary application of the present invention is for airborne moving target indication (AMTI) where there is a need for efficiently reordering the data received in range-bin sequences to an orthogonal azimuth-bin sequences, i.e., sequences of range-gated data at the same range bin over M radar sweeps. This reordered sequence is necessary to separately integrate radar echoes over M radar sweeps for each range bin. Although the present invention may be employed to equal advantage in other radar applications, such as squinted or side-looking, synthetic-array ground mapping and forward-looking, azimuth-scanning, doppler-beam-sharpening ground mapping, the AMTI application illustrates the essential features of the invention.

Figures 2, 3, 4, 5, 6:
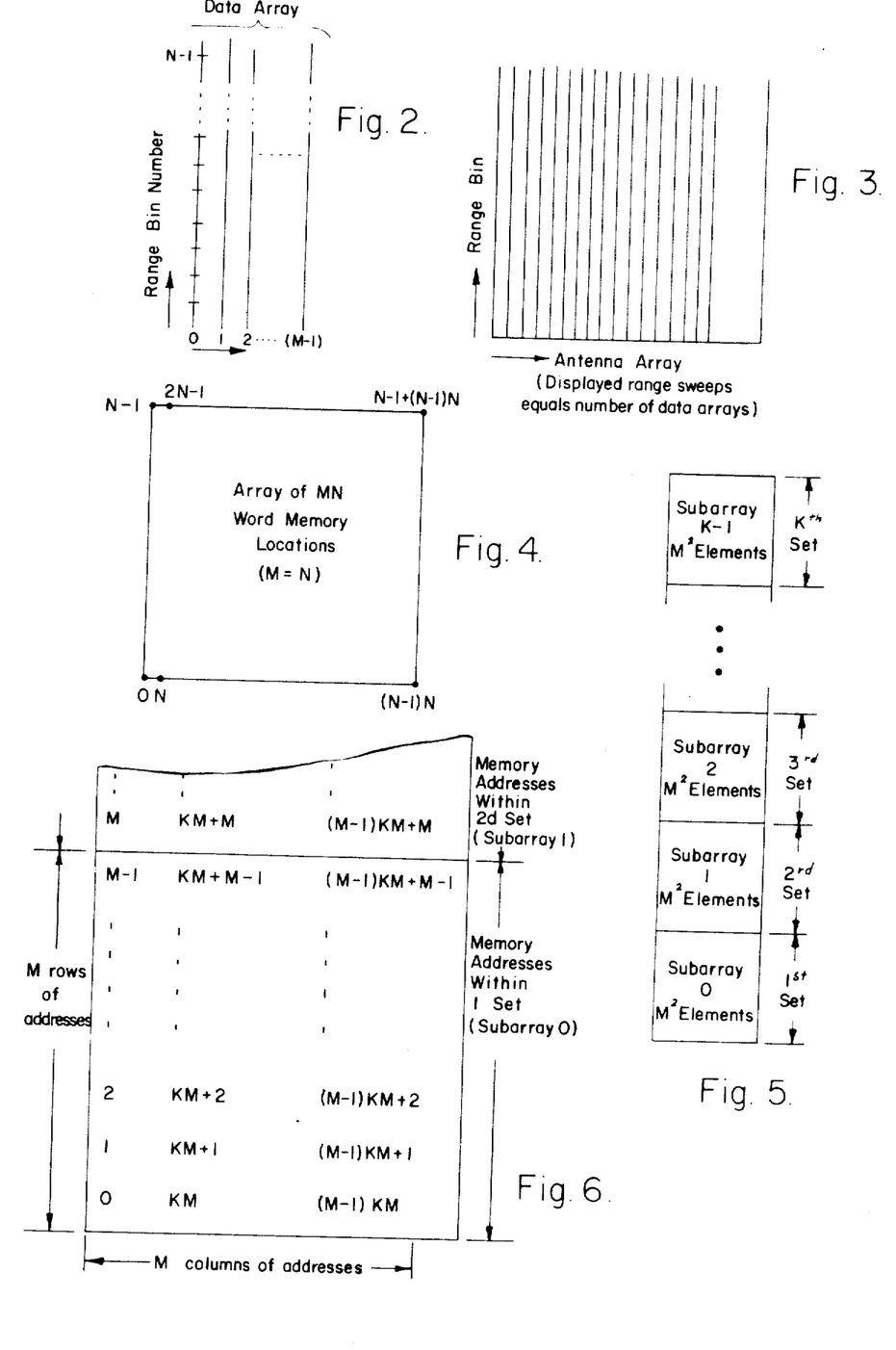
FIG. 2 is a diagram for explaining the arrangement of a scan array of data for M radar pulses.
FIG. 3 is a diagram for explaining an arrangement for displaying a plurality of scan arrays, one display range trace per scan array of M radar range sweeps.
FIG. 4 is a diagram for explaining the arrangement of successive address locations in a memory array adapted for storing MN words where M, the number of range bin samples, or equal groups of range bin samples, per range sweep.
FIG. 5 is a schematic diagram for explaining the arrangement of address location in a memory for MN words where N is equal to KM, and the MN word locations are divided into K subarrays, each subarray being capable of storing $M^2$ words in $M^2$ memory locations.
FIG. 6 illustrates the arrangement of $M^2$ memory locations in rows and columns.

FIG. 2 illustrates schematically a typical array produced by the radar 10 in the system of FIG. 1. As the antenna of the radar sweeps in azimuth over an array field, M range sweeps (one per radar pulse) numbered 0 to M−1 are produced. The PRF-sync signal generated by each radar pulse initiates the generation of N clock pulses for range gating at successive range intervals numbered 0 to N−1. An element of data is produced at each range interval commonly referred to as a range bin. Since each range sweep consists of N range bins, the data produced as the antenna sweeps in azimuth during the time of M radar pulses, i.e., during an array scan, may be viewed as an array of data consisting of azimuth lines (or rows) 0 to M−1 and orthogonal range bin lines (or columns) 0 to N−1. To allow the doppler filters to fully integrate M radar echoes from the same region in space, the antenna azimuth sweep rate must not exceed roughly an antenna azimuth beamwidth over the time that one array of M pulses is transmitted and received. That operating restriction is necessary to insure sufficient radar illumination of a common region over the M radar pulse intervals. FIG. 3 indicates the resulting B-scan display resulting from many reordered arrays over the entire antenna beam sweep region. It is noted that each displayed range sweep represents the integrated effect of M radar pulses. In other words, after doppler filtering integration, each entire array of M radar pulse range sweeps, such as illustrated in FIG. 2, is represented on the B-scan display by a single displayed range trace that includes the integrated effect of the M pulse range sweeps. Each range trace is presented on the face of a cathode ray tube at the antenna azimuth angle corresponding to the center of the M radar pulse range sweeps from which derived. As the antenna sweeps in azimuth through its scan, successive M pulse range sweep arrays cause adjacent range traces to be displayed.

Figure 7:
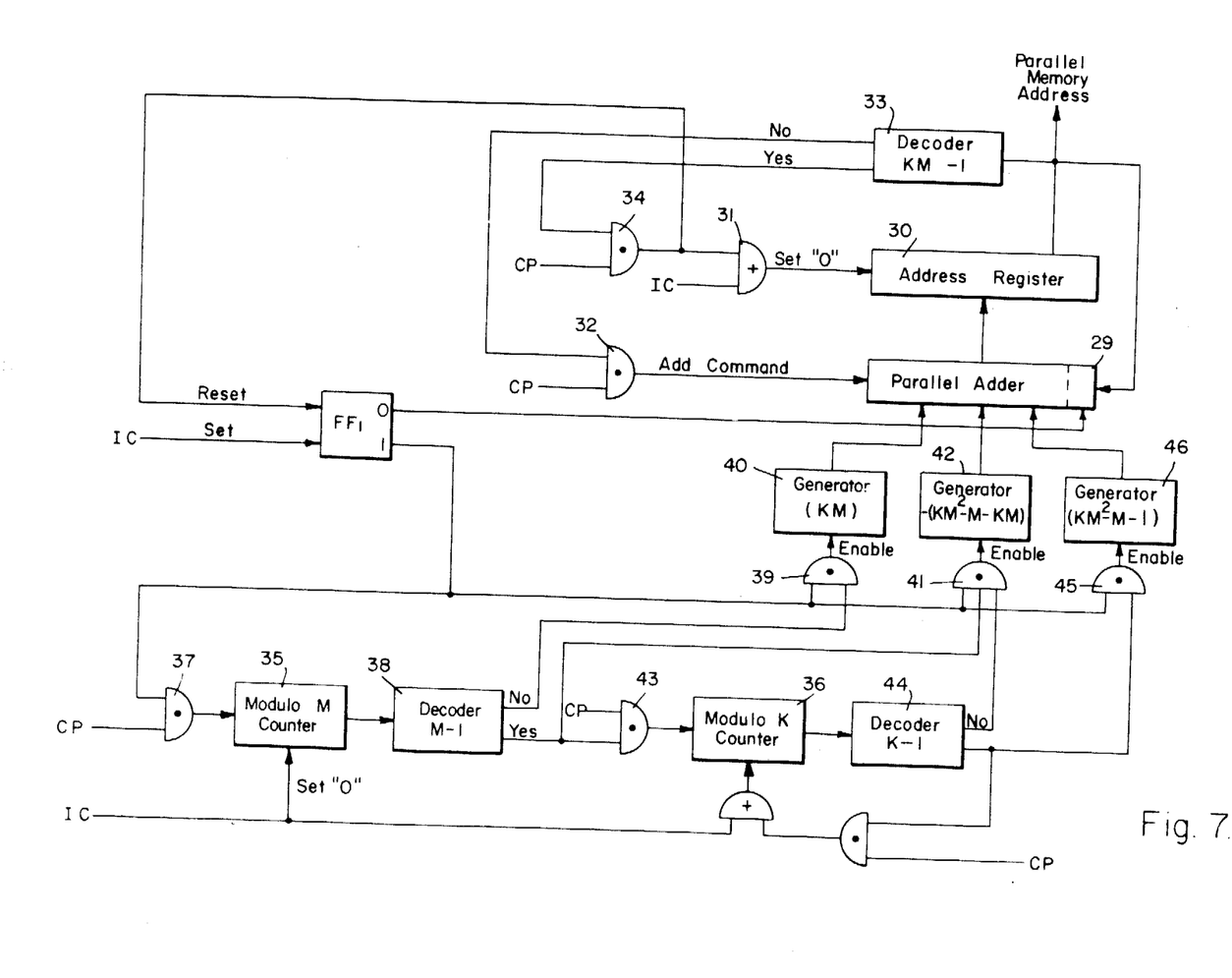
FIG. 7 is a logic diagram of an exemplary address sequence generator for the present invention.

The scan array illustrated in FIG. 2 is square when M is equal to N. Although such a square array is the simplest to convert in accordance with the present invention, using an $M^2$ memory schematically illustrated in FIG. 4, such a scan array is a special case. Accordingly, the specific embodiment to be described with reference to FIGS. 5 to 7 is for the more general case where the number of range bins N in a given range sweep is equal to KM, and K is an arbitrary integer. However, to facilitate understanding the system of FIG. 1, the special case of a square scan array may be assumed even though the schematic block diagram of FIG. 1 is applicable to the more general case.

Referring again to the block diagram of FIG. 1 which illustrates a low PRF system for airborne moving target indication (AMTI) and display, the video signal $V(t)$ is supplied in digital form to a digital doppler radar signal processing system which includes a digital doppler filter 11 that must receive range element data sequentially on a range-bin line basis while the radar 10 supplies video data on an azimuth line or range sweep basis. Accordingly, a scan conversion memory system 12 comprising a random access memory 13 and an address generator 14 is provided to receive the video data (converted) into digital form) on an azimuth line basis while an array field is being scanned, such as from radar pulse 0 to pulse M−1, and deliver the stored array of data to the digital doppler filter 11 on a range-bin line basis. The delivery is accomplished while simultaneously receiving data during the following scan array cycle.

The random access memory 13 is provided with a read-write cycle for each address produced by the generator 14 during which an old data word is read immediately before a new data word is written. Accordingly, while a stored array of data is being read from the random access memory 13 on a range-bin line basis, a new array of data is being stored on an azimuth line basis. That is readily accomplished by a simple address generator for a square scan array.

The arrangement of memory addresses in the random access memory 13 for the special case of a square scan array is illustrated in FIG. 4. To store one scan array of data with one range element stored in each memory location, the address generator 14 simply generates $N^2$ successive address numbers represented in FIG. 4 as being from 0 to N−1+(N−1)N where N is in the square scan array equal to the number M of range sweeps (radar pulses). In that manner the first azimuth line of data comprising data from range bins 0 to N−1 are stored in memory locations 0 to N−1. The next azimuth line of data received as the radar 10 scans from azimuth 0 to azimuth M−1 is then stored in memory locations numbered N to N+(N−1), and so forth until the last range sweep at azimuth M−1 is stored in memory locations numbered successively from (N−1 to N−1+(N−1)

To generate such a sequence of numbers from 0 to N−1+(N−1)N, the contents of an address register may be recirculated in parallel through a full parallel adder in response to each block pulse, each time adding one to the contents. To read the previously stored odd array out while simultaneously writing in a new even scan array of data, the sequence of addresses must be generated according to the following:

TABLE I

| Even Square Scan Array Data Storage (M=N) | | | | |
|---|---|---|---|---|
| line 1 | 0 | 0+N | 0+2N | ... | 0+(N−1)N |
| line 2 | 1 | 1+N | 1+2N | ... | 1+(N−1)N |
| line 3 | 2 | 2+N | 2+2N | ... | 2+(N−1)N |
| . | . | . | . | . |
| . | . | . | . | . |
| line M | N−1 | N−1+N | N−1+2N | ... | N−1+(N−1)N |

The foregoing table is to be read from left to right starting with the first line for even scan cycles. As noted hereinbefore, during the first and each successive odd-numbered scan array, the sequence of addresses needed is generated simply by counting up 0, 1, 2, ... (N−1)+(N−1)N. The sequence to be generated for the second and all subsequent even scan arrays given in the table I is generated by counting up by N from 0 to 0+(N−1)N for the first range bin line, counting up by N from 1 to 1+(N−1)N for the second range-bin line, and so forth, until the last range-bin line is to be read out by counting up by N from N−1 to N−1+(N−1)N. This second mode of generating addresses may be implemented by recirculating the contents of the address register through an adder, each time adding N for N successive memory access cycles, using a static register to store the addend N, and then resetting the address register to the count of one for the first of the next line of addresses. That may be readily accomplished by incrementing a first modulo N counter from 0 to N−1 as addresses for reading out a given range-bin line are generated, and incrementing a second modulo N counter with the output of the first counter. Thus, when the first counter determines that a range-bin line has been read out, it increments the second counter and simultaneously resets the address register to the new count of the second counter.

It should be noted that as an odd field scan is being read out in this manner, an even scan array is being stored, since for each range element read out on a range-bin line basis, there is a range element being stored on an azimuth line basis. Once the second counter has been incremented to the count of N−1, and that number has been used to reset the address register for reading out the Nth range-bin line, the second counter is recycled from N−1 to 0, Then as the last range element in the Nth range-bin line is read, the first counter is recycled to 0, and a mode control flip-flop is reset of control the generation of the simple sequence of addresses for odd scan arrays. When the next odd array scan cycle is complete, the mode control flip-flop is again set to initiate the sequence of addresses as set forth in table I.

Returning now to a general description of an exemplary application of the present invention, the digital doppler filter 11 applies digital filtering to digitally encoded discrete information samples read from the random access memory 13 as range elements from a given range-bin line. Various digital-filtering techniques have been devised in the past, some of which are described in chapter 7 of SYSTEM ANALYSIS BY DIGITAL COMPUTER edited by Franklin F. Kuo and James F. Keyser and published by John Wiley and Sons, Inc., (1966).

For many applications, data interpretation convenience makes it desirable to employ digital-filtering techniques which provide outputs that are insensitive the the phase angles of the inputs. A convenient method for guaranteeing complete phase insensitivity is to do all processing with data pairs consisting of in-phase and quadrature (I−Q) components of each data sample. Then the sums of the squares of the I−Q components can be used as filter outputs which are completely insensitive to input signal phase. However, this I−Q processing technique involves doubling the number of processor input signal channels comprising balanced mixers 15 and 16 which receive the video input $V(t)$ and a modulating signal from a local oscillator 17 which is applied to the mixer 15 through a phase shift network 18 to produce a component signal $X(t)$ equal to Re $[Z(t)]$ while the modulating signal is applied directly to the mixer 16 to produce a quadrature component $Y(t)$ equal to Im $[Z(t)]$. Low-pass filters 19 and 20 couple the outputs of the mixers 15 and 16 to analog-to-digital (A−D) converters 21 and 22. Low-pass filtering is employed in order to eliminate the spectrum components centered at $2 W_0$ in the $X(t)$ and $Y(t)$ channels and allow $X(t)$ AND $Y(t)$ to be uncorrupted extraneous spectral components in the individual channels at the low-pass filter outputs.

The A−D converters 21 and 22 are synchronized by clock pulses generated by the radar 10 as range gates periodically to simultaneously sample the in-phase and quadrature components of the video return during a given range sweep. Both of the converters 21 and 22 may be additionally synchronized by the PRF-sync signal generated by each radar pulse transmitted. That will assure that the converters are reset and ready for the first sample.

Each of the analog-to-digital converters 21 and 22 will quantize the samples into, for example, 16 levels in a binary form. Accordingly, each range element stored in the random access memory 13 will consist of two four-bit binary numbers, one for the in-phase sample and one for the quadrature sample. When a given range element is read into the digital doppler filter 11, the same pair of four-bit binary numbers are supplied for the digital-filtering process. The address generator 14 generates the necessary sequence of addresses as described hereinbefore with reference to FIG. 3 for the desired scan conversion in response to the clock pulses from the radar 10.

The clock pulses are also applied to the random access memory 13 to synchronize the read-write cycles, The radar 10 may also be provided with an array scan-sync signal, referred to hereinafter as an initial condition (IC) signal, to initially reset the mode control flip-flop of the address generator 14 for the odd array scan mode of operation.

The digital doppler filter 11 performs a spectrum analysis by essentially simulating an appropriate number of narrow band doppler filters to cover the required frequency region for each of N range bins. A total of M radar sweeps provides M doppler samples for each of the N range bins. The data reordering which allows one set of doppler filters to be time shared by spectrum analyzing one range bin at a time is performed by the scan conversion memory system 12 in accordance with the present invention. Thus, the digital doppler filter 11 operates on all M samples of a given range-bin line to form narrow band filter responses covering the required frequency range for a given range bin. Then the M samples from another range-bin line are processed, and so on.

The digital doppler filter bank 11 generates a set of filter outputs, one output per filter, for each range bin after M doppler samples from each range bin have been filtered and delivers these to a digital threshold detector 24. The digital threshold detector 24 performs thresholding for each range bin by comparing the output of each filter with a threshold value. If any filter in the digital doppler filter bank exceeds threshold then a target "hit" or a "1" voltage state is generated for that range bin. If no filter output exceeds threshold then a "0" voltage state is generated for that range bin indicating that no target "hit" exists in that range bin at the antenna azimuth line of the M pulse array from which the filtered data originated.

The digital doppler filter bank typically (though not necessarily) contains a set of digital filters identically shaped and equally covering essentially the entire spectrum between the PRF spectral lines. Normally the moving AMTI system receives strong ground clutter echoes which show up in the neighborhood of zero frequency and each PRF line. These ground clutter returns compete with actual moving target signal echoes which are typically several decibels below the ground clutter echoes. The doppler filter bank performs the AMTI function by filtering out the ground clutter echoes. The spectral width of the ground clutter is given by:

$$\frac{2V}{\lambda} \theta_b \sin\theta$$

Where:
$V=$ Aircraft ground speed
$\lambda=$ Radar wavelength
$\theta_b=$ Antenna beamwidth
$\theta=$ Azimuth angle of antenna As the antenna scans in azimuth, the ground clutter spreads out in frequency for maximum left or right antenna excursions and collapses toward zero for zero antenna azimuth. Those narrow band doppler filters which are too far into the same frequency as the ground clutter spectrum are normally disabled during such maximum antenna excursions to avoid false alarms. The number of filters disabled is a function of $$\frac{2V}{\lambda} \theta_b \sin\theta$$

(especially the antenna azimuth angle $\theta$). This disabling function is performed in the digital threshold detector 24 by merely ignoring those filters which are too heavily buried in ground clutter. The result is target information in the form of a series of binary 1's and 0's for a given range sweep. This target information is then displayed on a cathode ray tube 25 in a B-scan (antenna azimuth vs. range) mode of presentation with target presence indicated by a bright intensity spot produced by the binary 1's.

The horizontal (H) and vertical (V) sweeps of the cathode ray beam in the display 25 are controlled by a B-scan display control system 26 in response to the clock pulses and PRF-sync signals produced by the radar 10. That is readily accomplished for the B-scan display of FIG. 3 by counting clock pulses to generate a fast vertical sweep from bottom to top, with a fast flyback, and counting PRF-Sync signals to generate the slow horizontal sweep in such a manner that one vertical line display is generated for each scan array of data processed.

As noted hereinbefore, one array of $M^2$ memory locations is sufficient for the square scan array pattern. For the more general case of an array of M azimuth lines and KM range bins where K is an arbitrary integer, the range bins of the azimuth lines 0 to M−1 may be divided into square subarrays, each subarray comprising $M^2$ elements as shown in FIG. 5. It should be noted that in the simplest case, an element consists of a single range-bin sample, but may consist of several samples of successive range bins of a given azimuth.

The memory array for the more general case would consist of $KM^2$ locations arranged in K subarrays of $M^2$ memory locations numbered 0 to K−1, as shown in FIG. 6. A new data element is stored in each memory location addressed immediately after a previously stored data element is read out just as in the special case described hereinbefore with reference to FIGS. 3 and 4. The data elements thus stored are received from the radar 10 in sequence on an azimuth line (range sweep) basis while the previously stored data elements are read in sequence on a range-bin line basis. Accordingly, the scan conversion provides reading out of K range-bin lines, one from each subarray set of memory locations while data elements from a single range sweep are stored.

During the first and every subsequent odd scan cycle of the field, KM memory locations numbered from 0 to KM−1 are first addressed in sequence to store the data elements of the first range sweep of an array scan. Following that, the next KM memory locations are addressed in numerical sequence from address KM to an address KM+KM−1, and so forth, until the last one of M range sweeps is to be stored in the last KM memory locations addressed in sequence from address KM (m−1) to address $KM^2$−1. During the next (even) array scan cycle, and each subsequent even array scan cycle, the same number of $KM^2$ memory locations are addressed, but not in the same sequence as for storing the data on an azimuth line basis during the preceding odd scan cycle. Instead, the sequence generated is for reading out the previously stored data on a range-bin line basis starting with the first range-bin line of the first set for the first M elements, then jumping to the first range-bin line of the second set starting with the range bin M of the azimuth line 0, and so forth, concluding with the first range-bin line of the Kth set. Then the second range-gin line of each of the successive sets 0 to K−1 is read out in turn, and so forth until the Mth range-bin line of the Kth set has been read out.

While odd scan cycle data are being read out during an even scan cycle, the KM elements of a given range sweep are distributed in successive groups of M elements in the K subarrays such that the first M elements of the successive M range sweeps are stored in successive range-bin, lines of the first set (subarray 0). Similarly, the second group of M elements of each range sweep is stored in the second set (subarray 1), and so forth until the last group of M elements of successive range sweeps are stored in successive range-bin lines of the Kth set (subarray K−1). In that manner, during a following odd array scan cycle, when all of the $KM^2$ memory locations are addressed in numerical sequence from 0 to $KM^2$−1, successive groups of M elements read out pertain to different range-bin lines of data.

From the foregoing it may be seen that the multiple square subarray arrangement of the memory extends the present invention (described earlier with reference to the special case of a square array) to the more general case of a rectangular array to provide much greater array size flexibility while preserving much of the simplicity in addressing the memory locations. For example, during odd array scan cycles, the successive $KM^2$−1 memory locations are generated in a simple sequence. Such a simple sequence could be generated by a counter incremented in response to each clock pulse, but it is preferred to use an address register with a parallel adder so that, for the even array scan cycle, the addressing pattern may be readily altered by changing the addend from a binary one to different binary numbers at different times in order to address the same sequentially numbered addresses 0 to $KM^2$−1 in a different pattern. An exemplary pattern is shown in the following tables II and III where each pair of brackets enclose KM memory locations addressed to store data from one radar pulse range sweep.

TABLE II.—ODD ARRAY SCAN CYCLE ADDRESS SEQUENCE

| | | | |
|---|---|---|---|
| 0, | 1, | 2, − − − | M-1 |
| M, | M+1, | M+2, − − − | 2M-1 |
| 2M, | 2M+1, | 2M+2, − − − | 3M-1 |
| ⋮ | | | |
| (K-1)M, | (K-1)M+1, | (K-1)M+2, − − − | KM-1 |
| KM, | KM+1, | KM+2, − − − | KM+M-1 |
| KM+M, | KM+M+1, | KM+M+2, − − − | KM+2M-1 |
| KM+2M, | KM+2M+1, | KM+2M+2, − − − | KM+3M-1 |
| ⋮ | | | |
| KM+(K-1)M, | KM+(K-1)M+1, | KM+(K-1)M+2, − − − | KM+KM-1 |
| 2KM, | 2KM+1, | 2KM+2, − − − | 2KM+M-1 |
| 2KM+M, | 2KM+M+1, | 2KM+M+2, − − − | 2KM+2M-1 |
| 2KM+2M, | 2KM+2M+1, | 2KM+2M+2, − − − | 2KM+3M-1 |
| ⋮ | | | |
| 2KM+(K-1)M, | 2KM+(K-1)M+1, | 2KM+(K-1)M+2, − − − | 2KM+KM-1 |
| ⋮ | | | |
| (M-1)KM, | (M-1)KM+1, | (M-1)KM+2, − − − | (M-1)KM+M-1 |
| (M-1)KM+M, | (M-1)KM+M+1, | (M-1)KM+M+2, − − − | (M-1)KM+2M-1 |
| (M-1)KM+2M, | (M-1)KM+2M+1, | (M-1)KM+2M+2, − − − | (M-1)KM+3M-1 |
| ⋮ | | | |
| (M-1)KM+(K-1)M, | (M-1)KM+(K-1)M+1, | (M-1)KM+(K-1)M+2, − − − | $KM^2$-1 |

TABLE III.—EVEN ARRAY SCAN CYCLE ADDRESS SEQUENCE

| | | | |
|---|---|---|---|
| 0,..... | KM, | 2KM, – – – | (M−1)KM |
| M,... | KM+M, | 2KM+M, – – – | (M−1)KM+M |
| 2M,... | KM+2M, | 2KM+2M, – – – | (M−1)KM+2M |
| . | | | |
| (K−1)M, | KM+(K−1)M, | 2KM+(K−1)M, – – – | (M−1)KM+(K−1)M |
| 1, | KM+1, | 2KM+1, – – – | (M−1)KM+1 |
| M+1,. | KM+M+1, | 2KM+M+1, – – – | (M−1)KM+M+1 |
| 2M+1,... | KM+2M+1, | 2KM+2M+1, – – – | (M−1)KM+2M+1 |
| . | | | |
| (K−1)M+1,.. | KM+(K−1)M+1, | 2KM+(K−1)M+1, – – – | (M−1)KM+(K−1)M+1 |
| 2,........... | KM+2, | 2KM+2, – – – | (M−1)KM+2 |
| M+2,........ | KM+M+2, | 2KM+M+2, – – – | (M−1)KM+M+2 |
| 2M+2,....... | KM+2M+2, | 2KM+2M+2, – – – | (M−1)KM+2M+2 |
| . | | | |
| (K−1)M+2,.. | KM+(K−1)M+2, | 2KM+(K−1)M+2, | (M−1)KM+(K−1)M+2 |
| . | | | |
| M−1,........ | KM+M−1, | 2KM+M−1, – – – | (M−1)KM+M−1 |
| 2M−1,....... | KM+2M−1, | 2KM+2M−1, – – – | (M−1)KM+2M−1 |
| 3M−1,....... | KM+3M−1, | 2KM+3M−1, – – – | (M−1)KM+3M−1 |
| . | | | |
| KM−1,...... | KM+KM−1, | 2KM+KM−1, – – – | $KM^2-1$ |

In each table, the sequence of addresses is to be read from left to right, starting with the first row and progressing through successive rows downwardly such that for both scan cycles the first address is 0 and the last is $KM^2-1$, but only for the odd scan cycle are the intervening addresses generated as one continuous series of successive numbers.

As noted hereinbefore with reference to FIG. 5 and explicitly set forth in the exemplary patterns of tables II and III, the multiple square subarray arrangement of the memory is based on subdividing the data array into squares with the total number of range-bin elements stored in a subarray equal to square of the number of range sweeps. Each range-bin element consists of one or more range-bin samples.

The number K of subarrays is chosen such that MK is equal to N where N is the number of elements in a given range sweep or the number of range bins for the case of one range bin sample per element. Thus, the possible values of N differ by multiples of M.

In practice, N may be rounded off to the nearest satisfactory integer K while taking into account the number of range bins (samples) grouped into one memory word to form an element of data. For example, three 12-bit data samples (each representing one range bin) can be grouped into one range bin data element for storage in one 36-bit memory location. In that case a set of three range bins would be simultaneously scan converted in parallel by the scan conversion memory system 12, The utilizing device, shown in the exemplary application of the present invention as a digital doppler filter 11, would then be provided with three parallel channels and a buffer memory at the output thereof to allow further processing on a range-bin line basis, or with a buffer memory at the input and only one channel for processing data therein on a range-bin line basis. Although grouping more than one range-bin sample per element of data leads to some complexity in the utilization device, that technique has the advantage of requiring less frequent access to the scan conversion memory system and therefore can provide the advantage of increasing the allowable memory cycle time of the highly important array memory.

FIG. 7 illustrates an exemplary mechanization for generating the addressed sequences of tables II and III. As noted hereinbefore, table II shows one sequence of memory addresses for storing one array of data for the first and all odd array scan cycles, and table III shows another memory address sequence for storing arrays of data from all even array scan cycles, where an array consists of N range elements for each of M range sweeps and N is equal to KM. Thus, as read from left to right and top to bottom, table II shows the time sequence of addresses in which successive range-bin elements of successive range sweeps are stored. This then is the sequence which the memory address register 14 must generate for the first and each subsequent odd scan cycle. To simplify understanding the specific embodiment illustrated in FIG. 7 by way of example, and not by way of limitation, a single range-bin sample is assumed for each range-bin element, and therefore a single range-bin sample is to be stored in each memory address location.

The address sequence of table III allows data to be stored in the random access memory 13 while the previous array of data stored during an odd array scan cycle is converted. It should be noted that the address sequence of table III is incremented by KM within any given set of $M^2$ addresses such that only M consecutive memory addresses fall in any $M^2$ set. It should be noted that the same is true of the sequence in table II where only M addresses per $M^2$ set are sequential in time. In other words, viewing the $M^2$ memory locations of a set as being physically arranged according to FIGS. 5 and 6 into K sets, then during an odd scan, the sequence of table II progresses through all sets (subarrays) in a vertical direction for a given range sweep while during an even scan cycle, the sequence of table III progresses through all sets (subarrays) in sequence from subarray 0 to subarray K−1 in a horizontal direction within each set. Therefore, as new data is stored on an azimuth line basis, the array of data previously stored is read out on a range-bin line basis. It is noted that for each range sweep M addresses from each of the K square subarrays is addressed, It should be noted that scan converted data is not read from memory into the digital doppler filter 11 from successive range-bin lines. Instead it is read in an interlaced manner such that the first range-bin lines of all subarrays 0 to K−1 are read in sequence, followed by the second range-bin lines of all subarrays in sequence, and then the third, and so forth, until the Mth range-bin lines of all subarrays have been read in sequence. It is desirable for the CRT display 25 to present the data in proper physical range-bin and azimuth relationship for B-scan format. Therefore, the B-scan display control 26 will respond to PRF-sync pulses to horizontally step the CRT display by one azimuth line which corresponds to the azimuth movement of the antenna during M radar pulse range sweeps. The vertical sweep generator may consist of a register and an adder plus appropriate control logic for effectively counting by movements of M from 0 to (K−1) M for the first range trace of each new array and displaying K discrete spots on the CRT vertical sweep (for the current data array) with the spots separated in the resulting range trace by M spot spaces with beam intensity modulation for each spot according to target presence or absence as determined by the threshold detector 24. Synchronized with the second range trace of each array the CRT displays spots 1 through (K−1)M+1 jumping M spaces per spot displayed. On the third range trace per scan array, spots 2 through (K−1)M+2 are displayed, again jumping vertically M spaces per spot displayed. Finally, synchronized with the Mth range sweep per scan array, K additional vertical spots (M−1 through KM−1) are likewise displayed to complete the vertical display line corresponding to a data array with proper accounting for the interlaced data output from the threshold detector. In this manner, the range-bin lines which are interlaced by the scan conversion process are displayed as interlaced spots on the cathode ray tube to place each range-bin spot in proper position relative to all other range-bin lines of an array of data.

For ground mapping applications, where each doppler filter within each range bin corresponds to a point on the ground, all doppler filters would be displayed separately on the CRT in azimuth sweep segments, each containing a number of points equal to the number of doppler filters.

When the antenna sweeps to its extreme, it merely reverses direction and the CRT display azimuth is synchronized to initiate a new frame. Thereafter, the CRT display azimuth is stepped one azimuth increment for each scan array in the direction of antenna sweep.

To facilitate describing the arrangement of FIG. 7, it is convenient to speak of each subarray as an address set of M columns of memory locations and M rows of memory locations, as shown in FIG. 6, although the memory locations need not be physically arranged in such a matrix. The address sequence for the odd array scan cycles shown in table II may then be said to consist of sequentially addressing the first column (column 0) from all K subarrays, then sequentially addressing the next column (column 1) from all K subarrays, and so one, until all M columns have been addressed for all K subarrays starting with the memory location 0 and ending with the memory location $KM^2-1$. The complementary even array scan cycle sequence may be described in the same manner by simply substituting the word row for the word column.

It should be noted that in this description with reference to rows and columns of arrays, no reference is made to specific address numbers for individual numbers assigned to the memory locations. The present invention contemplates addressing during one array scan cycle corresponding columns of K subarrays in sequence, and during a following array scan cycle addressing corresponding rows of K subarrays in sequence. It is only for convenience, and to illustrate a specific embodiment that numerical values are assigned to the individual memory locations as shown in table II. Addressing by rows during a following array scan cycle then defines the arrangement of addresses in table III.

The memory locations to be addressed sequentially by column may take any other form to provide a different table. As before, the table for the odd array scan cycle then dictates the table for sequential addressing of memory locations by rows. The following tables IV and V are provided to show this flexibility in assigning numbers to memory locations to be addressed in sequence by column for the first and each subsequent odd-numbered array scan cycle.

It should also be noted that it is not important which direction of scanning the field is considered the first or odd cycle. The point is that once a particular pattern of numbers is selected for the array of memory locations to be addressed in sequence for a given scan cycle, whether it be a scan cycle by rows or columns, the pattern of numbers to be addressed for a following cycle is uniquely defined. However, it is economically important for the particular pattern selected to be simple for use in mechanizing a generator, and that it results in a pattern for even scan cycles that is not too complex to generate. As in tables II and III, each pair of brackets of tables IV and V contains those addresses which are scanned during a radar range trace and do not contain the set of addresses within an $M^2$ subarray.

Now referring to FIG. 7, which illustrates schematically an arrangement for implementing the generation of addresses ac-

TABLE IV.—ODD ARRAY SCAN CYCLE MEMORY ADDRESS SEQUENCE

| | | | |
|---|---|---|---|
| $0+0$, | $0+1$, | $0+2$, − − − | $M-1$ |
| $M^2+0$, | $M^2+1$, | $M^2+2$, − − − | $M^2+M-1$ |
| $2M^2+0$, | $2M^2+1$, | $2M^2+2$, − − − | $2M^2+M-1$ |
| . | | | |
| $(K-1)M^2+0$, | $(K-1)M^2+1$, | $(K-1)M^2+2$, − − − | $(K-1)M^2+M-1$ |
| $M+0$, | $M+1$, | $M+2$, − − − | $2M-1$ |
| $M^2+M+0$, | $M^2+M+1$, | $M^2+M+2$, − − − | $M^2+2M-1$ |
| $2M^2+M+0$, | $2M^2+M+1$, | $2M^2+M+2$, − − − | $2M^2+2M-1$ |
| . | | | |
| $(K-1)M^2+M+0$, | $(K-1)M^2+M+1$, | $(K-1)M^2+M+2$, − − − | $(K-1)M^2+2M-1$ |
| . | | | |
| $0+(M-1)M+0$, | $0+(M-1)M+1$, | $0+(M-1)M+2$, − − − | $0+(M-1)M+M-1$ |
| $M^2+(M-1)M+0$, | $M^2+M(-1)M+1$, | $M^2+(M-1)M+2$, − − − | $M^2+(M-1)M+M-1$ |
| $2M^2+(M-1)M+0$, | $2M^2+(M-1)M+1$, | $2M^2+(M-1)M+2$, − − − | $2M^2+(M-1)M+M-1$ |
| . | | | |
| $(K-1)M^2+(M-1)M+0$, | $(K-1)M^2+(M-1)M+1$, | $(K-1)M^2+(M-1)M+2$, − − − | $(K-1)M^2+(M-1)M+M+1$ |

TABLE V.—EVEN ARRAY SCAN CYCLE MEMORY ADDRESS SEQUENCE

| | | | |
|---|---|---|---|
| $0$, | $0+M$, | $0+2M$, − − − | $0+(M-1)M$ |
| $M^2+0$, | $M^2+M$, | $M^2+2M$, − − − | $M^2+(M-1)M$ |
| $2M^2+0$, | $2M^2+M$, | $2M^2+2M$, − − − | $2M^2+(M-1)M$ |
| . | | | |
| $(K-1)M^2+0$, | $(K-1)M^2+M$, | $(K-1)M^2+2M$, − − − | $(K-1)M^2+(M-1)M$ |
| $1$, | $1+M$, | $1+2M$, − − − | $1+(M-1)M$ |
| $M^2+1$, | $M^2+1+M$, | $M^2+1+2M$, − − − | $M^2+1+(M-1)M$ |
| $2M^2+1$, | $2M^2+1+M$, | $2M^2+1+2M$, − − − | $2M^2+1+(M-1)M$ |
| . | | | |
| $(K-1)M^2+1$, | $(K-1)M^2+1+M$, | $(K-1)M^2+1+2M$, − − − | $(K-1)M^2+1+(M-1)M$ |
| . | | | |
| $(M-1)$, | $(M-1)+M$, | $(M-1)+2M$, − − − | $(M-1)+(M-1)M$ |
| $M^2+(M-1)$, | $M^2+(M-1)+M$, | $M^2+(M-1)+2M$, − − − | $M^2+(M-1)+(M-1)M$ |
| $2M^2+(M-1)$, | $2M^2+(M-1)+M$, | $2M^2+(M-1)+2M$, − − − | $2M^2+(M-1)+(M-1)M$ |
| . | | | |
| $(K-1)M^2+(M-1)$, | $(K-1)M^2+(M-1)+M$, | $(K-1)M^2+(M-1)+2M$, | $(K-1)M^2+(M-1)+(M-1)M$ | cording to tables II and III, the assignment of successive numbers to memory locations to be addressed in sequence by column provides an extremely simple way of generating the necessary sequence of addresses for an odd cycle without unduly complicating the generation of a sequence of addresses for the even cycles. At the beginning of an odd cycle, an initial condition signal (IC) from the radar 10 resets a mode control flip-flop $FF_1$ which injects a carry into the least significant bit (LSB) position of a parallel adder 29. At the same time, the signal IC resets an address register 30 to zero through an OR-gate 31 to generate the first address for the memory location zero. Following that each clock pulse transmitted through an AND-gate 32 causes the content of the address register 30 to be recirculated through the parallel adder 29 so that the carry being injected into the LSB position of the parallel adder is added, thereby causing the content of the address register to be incremented by one each time it is recirculated. A decoder 33 determines when the address $KM^2-1$ has been reached as the last address of the sequence shown in table I. When that occurs, an AND-gate 34 is enabled and the AND-gate 32 is disabled. The next clock pulse is then transmitted through the AND-gate gate 34 and the OR-gate 31 to reset the address register 30 to zero for the first address of the next sequence for an even scan cycle shown in table III.

While the address register 30 is being reset by a clock pulse from the AND-gate 34 via the OR gate 31, the mode control flip-flop $FF_1$ is being set to remove the continuous injection of a carry into the LSB position of the parallel adder 29. When the flip-flop $FF_1$ is set, a modulo M counter 35 and a modulo K counter 36 control the amount by which the content of the address register 30 is increased each time it is recirculated in response to a clock pulse through AND-gate 32 which is again enabled once the address register 30 is reset through the AND-gate 34.

Both of the counters 35 and 36 are initially set to zero by the signal IC at the beginning of an odd scan cycle, and remain at zero until the mode control 1 flip-flop $FF_1$ is set to enable and AND-gate 37 to transmit clock pulses to the counter 35. A decoder 38 determines when the counter 35 has been advanced from 0 to M−1 in response to M−1 clock pulses. During those first M−1 clock pulses of the even scan cycle, an AND-gate 39 transmits an enable signal to energize a network 40 which continually generates a binary number having a value KM as an addend applied to the parallel adder 29. In that manner, the first M addresses are generated by increasing the content of the address register in increments of KM from 0 to (M−1) KM.

When the decoder 38 detects the count of M−1, the AND-gate 39 is disabled and an AND-gate 41 is enabled in its place. The AND-gate 41 enables a network 42 to generate, in a binary form, the 2's complement of the value $KM^2-M-KM$. When that value expressed in the 2's complement form is added to the content of the address register 30 in response to the next clock pulse, the result is subtraction of that value to produce as the next address a binary number having the value M. At the same time the counter 35 is recycled to the count of 0 so that during the next clock pulse, the AND-gate 41 is disabled, and the AND-gate 39 is again enabled to cause the value KM generated by the network 40 in binary form to be added to the content of the address register 30. In that manner, the next sequence of M addresses is generated from M to (M−1)KM+M. At that time the counter 35 has again advanced to the count of M−1 and the decoder 38 enables the AND-gate 41 and disables the AND-gate 39 for one clock period to cause the value $KM^2-M-KM$ to be generated in the 2's complement form by the network 42. The next clock pulse then recycles the counter 35 to zero while causing the binary number being generated by the network 44 to be added to the content of the address register to generate the next address 2M. That starts the third sequence of M addresses. The pattern is repeated until the modulo K counter 36 reaches the count of K−1 in response to clock pulses transmitted through an AND-gate 43 each time the decoder 38 detects a count of M−1. At that time a decoder 44 detects that count and disables the AND-gate 41 which would otherwise be enabled by the decoder 38.

The decoder 44 enables and AND-gate 45 while it is disabling the AND-gate 41. The enabled AND-gate 45 the energizes a network 46 which generates a binary number having the value $KM^2-M-1$ in the 2's complement form so that when that number is added to the content of the address register 30 in response to the next clock pulse, that value is subtracted from the address (M−1KM+(K−1)M to generate the first address of the next sequence of M addresses from 1 to (M−1)KM+). The modulo K counter 36 is employed to terminate the operation of the AND-gate 41 and enable the AND-gate 45 for one clock period, and thereby cause the next sequence of M addresses to be generated in the same manner as the first sequence of M addresses, but starting from the address 1 instead of 0. In that regard, it should be noted that the modulo K counter 36 is incremented only by one clock pulse out of every M clock pulses, which is that clock pulse gated by the AND-gate 43 while the decoder 38 is detecting a count of M−1 in the modulo M counter 35. Thus, the modulo K counter 36 counts the number of rows of M sequential addresses generated to complete one set and initiate the next set with the starting address incremented by one. Upon initiating the next set, the counter is reset by a clock pulse transmitted through an AND-gate 47 and an OR-gate. 48. Otherwise, the network 46 would remain enabled for the next M−1 clock pulses.

At the end of an even array scan cycle, the address $KM^2-1$ is again detected by the decoder 33 to enable the AND-gate 34. That would normally cause the flip-flop $FF_1$ to be set to initiate another even scan cycle, but as noted hereinbefore, at the beginning of an odd scan cycle a signal IC is transmitted by the radar 10 which sets the address register to 0 so that the count of $KM^2-1$ is no longer being detected by the decoder 33 when the next clock pulse marking the first range gate of the range sweep 0 occurs. At the same time, the signal IC resets the counters 35 and 36 to assure proper generation of the next even cycle sequence.

It should be noted that the networks 40, 42 and 46 have been shown separately, each with a single input to the parallel adder 29 to represent parallel inputs to the appropriate bit positions. However, in practice the networks 40, 42 and 45 are combined through OR gates, one OR gate for each order of the parallel adder with appropriate energized input terminals from the respective networks. Each network consists of a bank of AND gates, one gate for each bit one of the binary number to be generated. It should also be noted that the address register transmits its content to the parallel adder 29 through parallel connections represented for simplicity by a single connection, and the sum from the parallel adder is entered into the address register 30 through parallel connections again represented by a single connection for simplicity.

The fundamental concept of the multiple square subarray arrangement of the memory takes advantages of the independence of data from different range bins. This independence allows independent separate scan conversion of all data on a range-bin line basis. Specifically, each subarray of memory locations is arranged to contain M memory addresses for each of M range sweeps for a total of $M^2$ memory addresses, In that manner, the square array of memory addresses may contain M range-bin lines arranged in either direction. In other words, the squareness of a given subarray provides an important periodicity of the memory address sequence, wherein all address sequences for odd scans are identical and all address sequences for even scans are identical. This allows an array of $M^2$ memory addresses to be used to store and convert data from a given range bin from a sequence of M range sweeps into the range-bin line set in a group of M memory locations.

What is claimed is:

1. Apparatus for conversion of a rectangular array of data having a number of rows which differ from a number of columns such that one number is an integral K multiple of the other comprising:
   a memory having a number of addressable locations sufficient for storing said rectangular array of data, one element of data in each location, and said locations being grouped into K subarrays each of M columns and M rows and $M^2$ elements; and an address sequence generator including first means for addressing in sequential locations each of said memory elements in each column to store elements of said array of data as received in sequence in successive columns of said subarrays starting with the first column of each subarray, taking said subarrays in a given order, and concluding with the last column of each subarray, and second means for sequentially addressing locations of said memory to read said elements of said array just stored from successive rows of said subarrays starting with the first row of each subarray, taking said subarrays in said given order, and concluding with the last row of each subarray.

2. The combination of claim 1 further including means for reading an element of data from a given location addressed immediately before storing a new element of data therein.

3. Apparatus for conversion of a rectangular array of data having a number of rows which differs from a number of columns comprising:

a memory having a number of addressable locations sufficient for storing said rectangular array of data, one element of data in each location, with said locations being grouped into K subarrays of M columns and M rows, each including $M^2$ memory locations;

an address sequence generator including first means for addressing said memory locations in numerical sequence from 0 to $KM^2-1$, and second means for addressing said memory location in a second order increasing the address in steps of KM from 0 to $KM^2-1$ in cycles of M addresses for each set of consecutive KM addresses generated, starting each cycle after the first with a multiple of M from M to $(K-1)M$, and repeating the pattern through M sets, the first address of each set being a number just one greater that the first address of the preceding set.

4. Apparatus for conversion of each of a sequence of arrays of radar range data, a given array having a number N of range elements which differs from a number M of range sweeps such that the number N is a multiple K of the number M comprising:

a random access memory having a number NM of addressable locations for storing a given one of said arrays of data, one element of data in each location, and said locations being grouped into K subarrays of equal M columns and N rows;

means for reading an element of data from a given location addressed immediately before storing a new element of data therein from the next array of said sequence of arrays;

address sequence generating means having two modes of operation, a first mode for addressing locations of said memory in a first predetermined sequence selected to provide K square subarrays of $M^2$ memory locations to store elements of an array of data as received in order in successive columns of said subarrays starting with the first column of each subarray, taking said subarrays in a given sequence, and concluding with the last column of each subarray, and a second mode for addressing locations of said memory in a second predetermined sequence to read said elements of said array just stored from successive rows of said subarrays starting with the first row of each subarray, taking said subarrays in said given order, and concluding with the last row of each subarray, said address sequence generating means including first means to provide said first predetermined sequence by addressing said memory locations in numerical sequence from A to $A+(KM^2\pi)$, where A is an arbitrary number, and second means to provide said second predetermined sequence by increasing the address in steps of KM from A to $A+(K^2-1)$ in cycles of M addresses for each set of consecutive KM addresses generated, starting each cycle after the first with A plus a multiple of M from M TO $(K-1)M$, and repeating the pattern through M sets, the first address of each set being a number just one greater than the first address of the preceding set;

and means for continually alternating said address sequence generator between said first and second means after each sequence of NM memory location addresses has been generated.

* * * * *

Disclaimer and Dedication 3,633,173.—*Charles F. Edge*, Los Angeles, Calif. DIGITAL SCAN CONVERTER. Patent dated Jan. 4, 1972. Disclaimer and dedication filed Aug. 17, 1973, by the assignee, *Hughes Aircraft Company*.

Hereby disclaims all claims of said patent and dedicates to the Public the entire term of said patent.

[*Official Gazette December 4, 1973.*]